(12) United States Patent
Nakayama

(10) Patent No.: US 10,587,341 B2
(45) Date of Patent: Mar. 10, 2020

(54) HDMI OPTICAL CABLE AND HDMI OPTICAL CONVERSION DEVICE

(71) Applicant: AIM ELECTRONICS CO., LTD., Sagamihara-shi, Kanagawa (JP)

(72) Inventor: Eishi Nakayama, Kawasaki (JP)

(73) Assignee: AIM ELECTRONICS CO., LTD., Sagamihara-shi, Kanagawa (JP)

( * ) Notice: Subject to any disclaimer, the term of this patent is extended or adjusted under 35 U.S.C. 154(b) by 0 days.

(21) Appl. No.: 16/343,570

(22) PCT Filed: Oct. 16, 2017

(86) PCT No.: PCT/JP2017/037429
§ 371 (c)(1),
(2) Date: Apr. 19, 2019

(87) PCT Pub. No.: WO2018/074435
PCT Pub. Date: Apr. 26, 2018

(65) Prior Publication Data
US 2019/0253144 A1 Aug. 15, 2019

(30) Foreign Application Priority Data
Oct. 20, 2016 (JP) .................................. 2016-218433

(51) Int. Cl.
*H04B 10/2575* (2013.01)
*H01R 13/66* (2006.01)
(Continued)

(52) U.S. Cl.
CPC ......... *H04B 10/25751* (2013.01); *G02B 6/42* (2013.01); *G02B 6/4201* (2013.01);
(Continued)

(58) Field of Classification Search
CPC .. H04B 10/25751; H04B 10/50; H04B 10/66; G02B 6/42; G02B 6/4201; G02B 6/44;
(Continued)

(56) References Cited

U.S. PATENT DOCUMENTS 7,706,691 B2 * 4/2010 Lin ........................... G06F 3/14
398/106
8,458,378 B2 * 6/2013 Doi ........................ G02B 6/4469
710/31
(Continued)

FOREIGN PATENT DOCUMENTS

JP 2011-138783 A 7/2011
JP 2015-167396 A 9/2015
(Continued)

OTHER PUBLICATIONS

International Search Report (PCT/ISA/210) dated Dec. 26, 2017 issued by the International Searching Authority in International Application No. PCT/JP2017/037429.
(Continued)

*Primary Examiner* — Abbas H Alagheband
(74) *Attorney, Agent, or Firm* — Sughrue Mion, PLLC

(57) ABSTRACT

Conventional HDMI optical cables are structured to be unable to normally transmit connection detection between HDMI transmission device and reception device, and unable to avoid a communication failure. Therefore, a phenomenon in which an image is distorted or does not appear occurs. By using an HDMI optical cable and an
HDMI optical conversion device in which an electronic circuit switch having a device connection detection function, a voltage converter, a detection sensor, and a detection signal transmission-only wire are embedded in a connector and a cable, respectively, it becomes possible to stably perform
(Continued)

connection detection and communication between HDMI transmission device and reception device, and show an image.

2 Claims, 3 Drawing Sheets

(51) Int. Cl.

| | |
|---|---|
| H04B 10/50 | (2013.01) |
| H04N 21/4363 | (2011.01) |
| H04B 10/66 | (2013.01) |
| G02B 6/42 | (2006.01) |
| G06F 3/00 | (2006.01) |
| H04N 21/436 | (2011.01) |
| G02B 6/44 | (2006.01) |
| H04N 21/41 | (2011.01) |
| H04B 10/25 | (2013.01) |
| H04B 10/00 | (2013.01) |

(52) U.S. Cl.
CPC ............... *G02B 6/44* (2013.01); *G06F 3/00* (2013.01); *H01R 13/66* (2013.01); *H01R 13/6683* (2013.01); *H01R 13/6691* (2013.01); *H04B 10/50* (2013.01); *H04B 10/66* (2013.01); *H04N 21/41* (2013.01); *H04N 21/436* (2013.01); *H04N 21/43635* (2013.01); *H04B 10/12* (2013.01); *H04B 10/25* (2013.01)

(58) Field of Classification Search
CPC ............ H01R 13/6683; H01R 13/6691; H04N 21/41; H04N 21/436; H04N 21/43635
USPC .......................................................... 398/116
See application file for complete search history.

(56) References Cited

U.S. PATENT DOCUMENTS

| | | | |
|---|---|---|---|
| 9,048,952 B2* | 6/2015 | Niiho | H04B 10/25 |
| 9,323,018 B2* | 4/2016 | Lin | G02B 6/43 |
| 10,241,283 B1* | 3/2019 | Shen | G02B 6/4246 |
| 2006/0031611 A1* | 2/2006 | Konda | H04N 7/22 710/72 |
| 2010/0316388 A1* | 12/2010 | Shastri | G09G 5/006 398/115 |
| 2011/0091219 A1* | 4/2011 | Tatum | G02B 6/4201 398/142 |
| 2011/0316962 A1* | 12/2011 | Doi | H04N 21/43635 348/14.01 |
| 2012/0229706 A1* | 9/2012 | Kabuto | H04N 21/43635 348/723 |
| 2013/0183045 A1* | 7/2013 | Niiho | G02B 6/28 398/142 |
| 2014/0232939 A1* | 8/2014 | Kabuto | H04N 21/43635 348/723 |
| 2015/0010311 A1* | 1/2015 | Parekh | G02B 6/4293 398/116 |
| 2016/0301472 A1* | 10/2016 | Parekh | G02B 6/4293 |
| 2017/0068061 A1* | 3/2017 | Yang | G02B 6/4284 |
| 2017/0374349 A1* | 12/2017 | Nakajima | G09G 5/006 |
| 2018/0097565 A1* | 4/2018 | Parekh | G02B 6/4293 |
| 2019/0295745 A1* | 9/2019 | Peng | G02B 6/4436 |

FOREIGN PATENT DOCUMENTS

| | | |
|---|---|---|
| JP | 2016-525831 A | 8/2016 |
| WO | 2013099069 A1 | 7/2013 |

OTHER PUBLICATIONS

Written Opinion (PCT/ISA/237) dated Dec. 26, 2017 issued by the International Searching Authority in International Application No. PCT/JP2017/037429.

* cited by examiner

HDMI OPTICAL CABLE AND HDMI OPTICAL CONVERSION DEVICE

TECHNICAL FIELD

The present invention relates to a cable including an HDMI (registered trademark) connector and an interface of the connector, and a structure and performance inside the connector, and particularly relates to an HDMI optical cable having a structure that includes a device connection detection function inside a connector thereof to enable stable signal transmission.

BACKGROUND ART

An HDMI cable that connects an HDMI transmission device and an HDMI reception device includes a TMDS video transmission line that transmits a video signal and a clock signal, a DDC signal line that transmits EDID information of the HDMI reception device to the HDMI transmission device, a power supply line that supplies +5V power from the HDMI transmission device to the HDMI reception device, and an HPD signal line used for connection detection (so-called hot plug detection) of the HDMI reception device to the HDMI transmission device.

The HPD signal line is typically connected to the power supply line via a resistor on a side of the HDMI reception device connected to the HDMI transmission device. Accordingly, a predetermined voltage is applied to the HPD signal line, so that a connection of the HDMI reception device is detected by the HDMI transmission device based on the voltage of the HPD signal line. In the hot plug detection, the connection of the HDMI reception device is detected regardless of whether the HDMI reception device is in an ON state.

The TMDS video transmission line transmits a video signal or the like based on a voltage change corresponding to ON/OFF control of a current on the HDMI transmission device side, on a termination condition that is pulled up to +3.3V on the HDMI reception device side in the ON state. When the HDMI reception device is in an OFF state and the TMDS video transmission line is not pulled up, a voltage of the TMDS video transmission line does not change appropriately. Therefore, the HDMI transmission device monitors the voltage change of the TMDS video transmission line, and stops the transmission of a video signal or the like when the voltage of the TMDS video transmission line does not change appropriately. In other words, it can be said that the TMDS video transmission line is used for device connection detection of the HDMI reception device, Which includes detection of an operating state (ON state or OFF state) of the HDMI reception device.

There has been known an HDMI optical cable in which the TMDS video transmission line is configured by an optical fiber wire instead of an electric wire (see, for example, Patent Document 1).

PRIOR ART DOCUMENT

Patent Document

Patent Document 1: JP-A-2015-167396

SUMMARY OF INVENTION

Problems to be Solved in that HDMI optical cable, an electrical signal cannot be physically transmitted and received since an electric wire for TMDS video signal transmission used for device connection detection is replaced by an optical fiber wire. Therefore, there is a disadvantage that the HDMI transmission device cannot accurately detect whether the HDMI reception device can receive signals using the electric wire for TMDS video signal transmission that is used to transmit a video signal to the HDMI reception device.

The HDMI transmission device needs to detect whether the HDMI reception device can receive signals before signal transmission according to the HDMI standard. As such detection method, it is common to use the electric wire for TMDS video signal transmission for the HDMI transmission device to transmit a video signal to the HDMI reception device. However, in the conventional HDMI optical cable, an electrical signal cannot be physically transmitted and received, so that device connection cannot be detected since the electric wire for TMDS video signal transmission used for the device connection detection is replaced by the optical fiber wire. Therefore, the HDMI transmission device having an HDMI output terminal cannot accurately determine whether the reception device including an HDMI terminal is operable and becomes uncontrollable within the HDMI transmission device, so that there are cases where normal signal transmission and video display cannot be performed. Therefore, a phenomenon in which a video is not displayed or distorted occurs.

Means for Solving Problems

An operation signal detection sensor is provided inside an HIM reception device side connector, and the operation signal detection sensor is connected to a TMDS video transmission line. A dedicated electric wire for transmission of an operation signal of the HDMI reception device detected by the operation signal detection sensor to the HDMI transmission device side connector is provided in the cable, a voltage converter having an electronic circuit switch function that receives a signal from the operation signal detection sensor is provided inside the HDMI transmission device side connector, and an output of the voltage converter is connected to the TMDS video transmission line. A part of power supplied from a power supply line is voltage-converted by the voltage converter, the output of the voltage converter is controlled based on a signal from the operation signal detection sensor, and an operation state of the HDMI reception side device is transmitted to the HDMI transmission side device through the TMDS video transmission line. An HDMI optical cable and an HDMI optical conversion device having the above configuration are provided.

Effects

According to the present invention, while having usability same as the conventional HDMI optical cable, a defect phenomenon due to a combination of a transmission device and a reception device which have HDMI terminals does not occur, so that stable signal transmission can he performed, and a video can be displayed stably

DETAILED DESCRIPTION OF EMBODIMENTS

Figure 1:
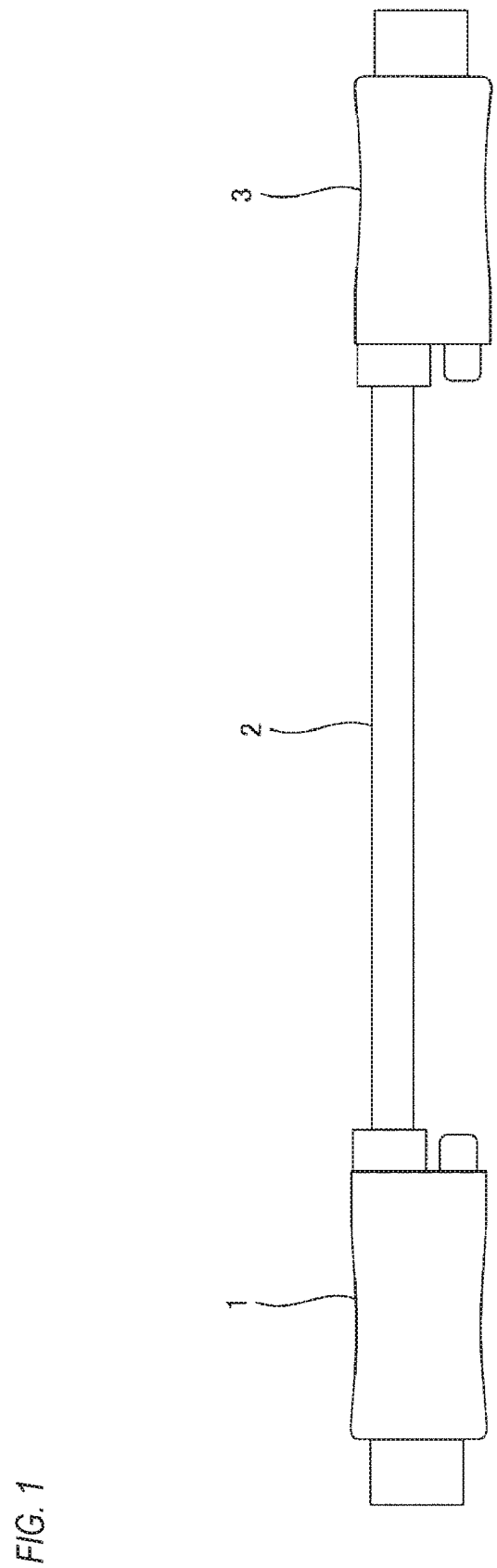
FIG. 1 is a diagram illustrating an example of an HDMI optical cable according to an embodiment of the present invention.
Figure 2:
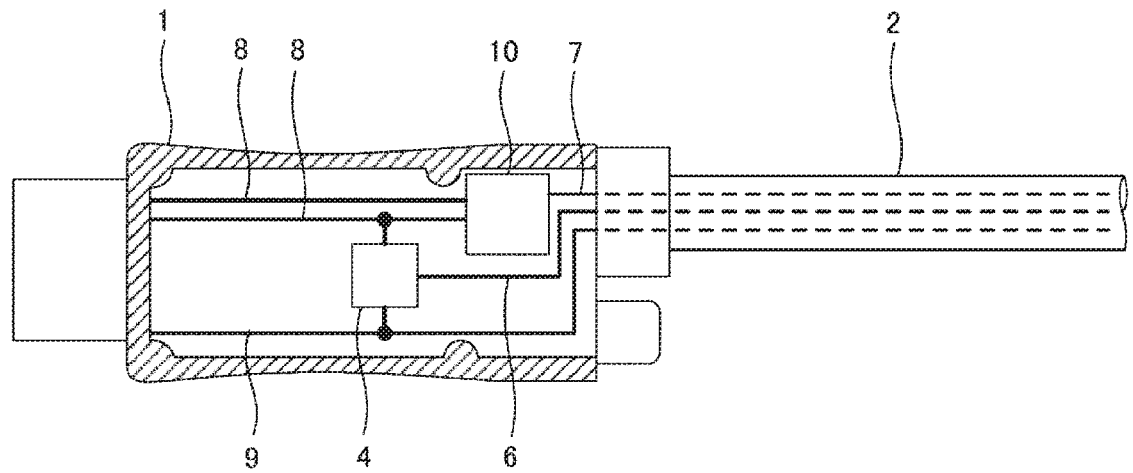
FIG. 2 is a diagram illustrating an internal structure of a transmission device side connector of the HDMI optical cable in FIG. 1.
Figure 3:
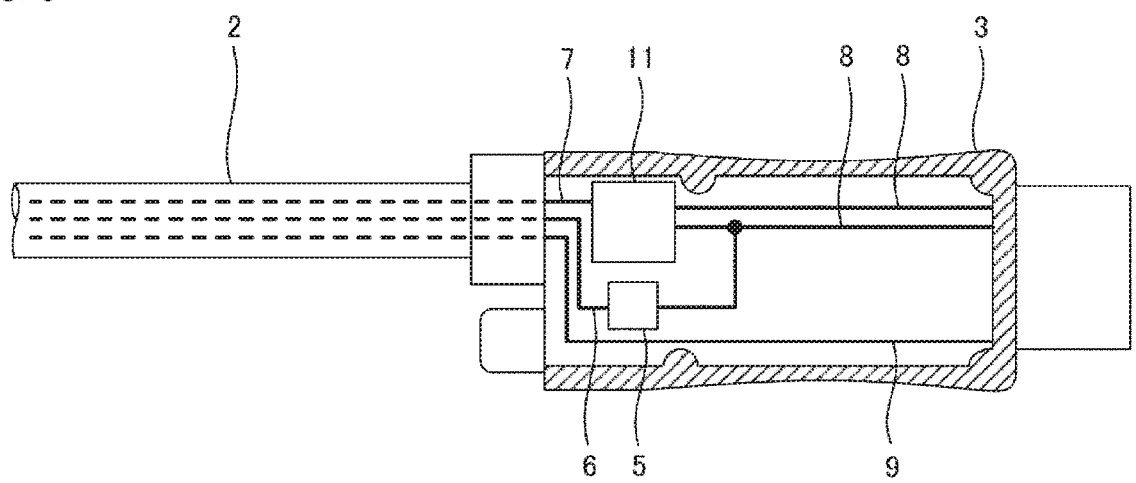
FIG. 3 is a diagram illustrating an internal structure of a reception device side connector of the HDMI optical cable in FIG. 1.

An HDMI optical cable illustrated in FIGS. 1 to 3 integrally includes a transmission device side connector 1 to be connected to an HDMI transmission device, a reception device side connector 3 to be connected to an HDMI reception device, and a cable 2 connecting the transmission device side connector 1 and the reception device side connector 3. The cable 2 includes an optical fiber wire 7 configured to transmit an RUB video signal and a clock signal from the HDMI transmission device to the HDMI reception device, a power supply line 9 configured to supply +5V power from the HDMI transmission device to the HDMI reception device, and a detection signal transmission dedicated line 6 configured to transmit a connection detection signal from the HDMI reception device to the HDMI transmission device. The power supply line 9 and the detection signal transmission dedicated line 6 are electric wires such as copper wires.

As illustrated in FIG. 2, one end of the optical fiber wire 7 is connected to an optical transmitter 10 inside the transmission device side connector 1, and the optical transmitter 10 and a terminal of the transmission device side connector 1 are connected by TMDS video transmission lines 8. As illustrated in FIG. 3, another end of the optical fiber wire 7 is connected to an optical receiver 11 inside the reception device side connector 3, and the optical receiver 11 and a terminal of the connector 3 are connected by TMDS video transmission lines 8. The TMDS video transmission lines 8 are electric wires such as copper wires. The TMDS video transmission lines 8 are normally provided in a pair of + side and − side for each lane of an R video signal lane, a G video signal lane, a B video signal lane, and a clock signal lane.

Electric signals as a video signal and a clock signal output from the HDMI transmission device are input to the optical transmitter 10 via the TMDS video transmission lines 8 inside the transmission device side connector 1 and converted from electric signals to optical signals by the optical transmitter 10. The optical signals are transmitted to the optical receiver 11 inside the reception device side connector 3 via the optical fiber wire 7. Then, the video signal and the clock signal input to the optical receiver 11 are converted from optical signals to electric signals by the optical receiver 11 and input to the HDMI reception device via the TMDS video transmission lines 8 inside the reception device side connector 3.

As described above, when the HDMI reception device to which the reception device side connector 3 is connected is in an OFF state, the voltage of the TMDS video transmission lines 8 inside the reception device side connector 3 is unstable, whereas when the HDMI reception device is in an ON state, the TMDS video transmission lines 8 inside the reception device side connector 3 are pulled up to +3.3V However, the optical fiber wire 7 cannot transmit a voltage change of the TMDS video transmission lines 8 inside the reception device side connector 3 along with the pull up to the TMDS video transmission lines 8 inside the transmission device side connector 1. The HDMI optical cable transmits the voltage change of the TMDS video transmission lines 8 inside the reception device side connector 3 along with the pull up to the TMDS video transmission lines 8 inside the transmission device side connector 1 using the detection signal transmission dedicated line 6.

Figure 4:
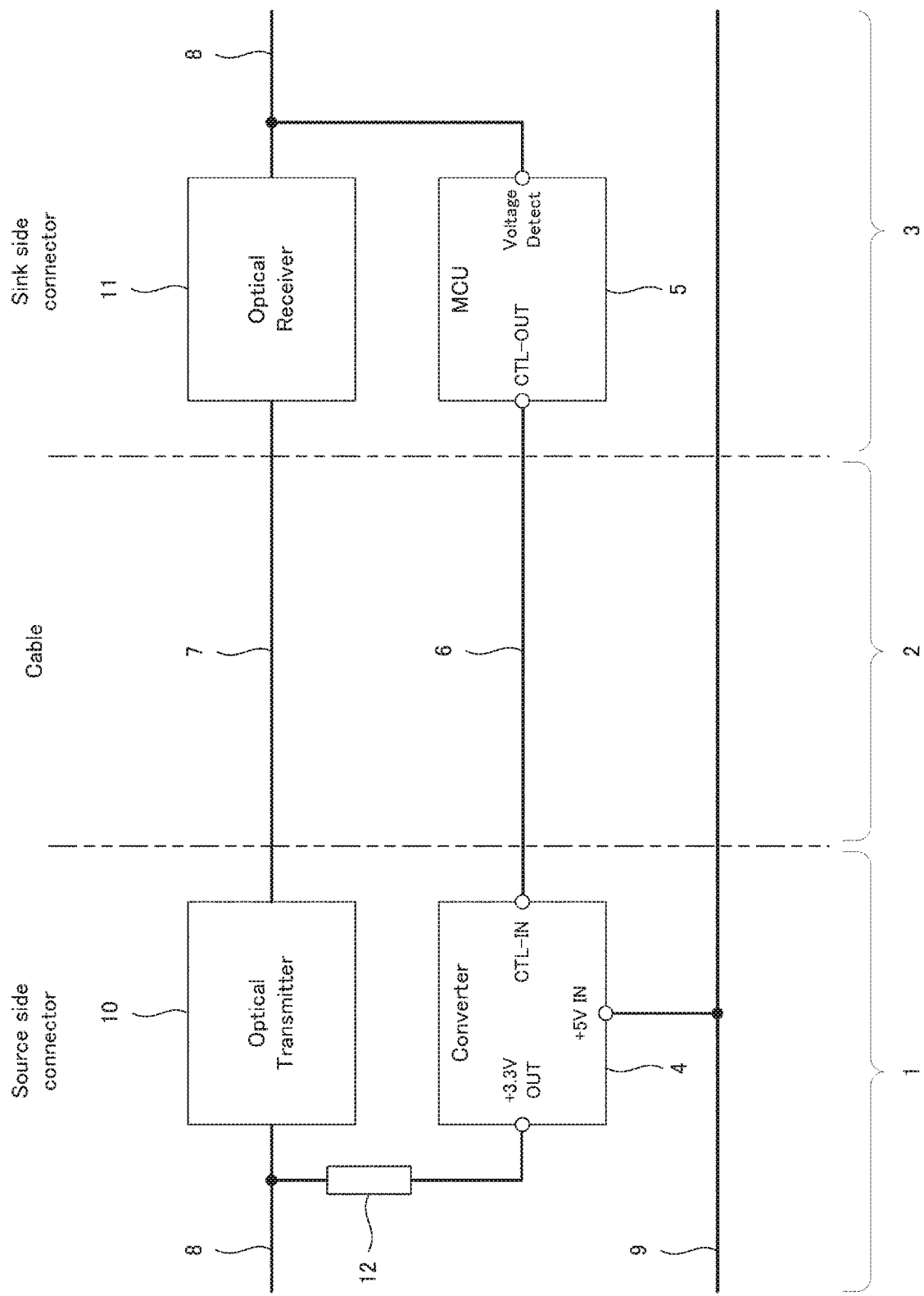
FIG. 4 is a block diagram of the HDMI optical cable in FIG. 1.

Referring also to FIG. 4, the reception device side connector 3 includes an operation signal detection sensor 5. The operation signal detection sensor 5 is connected to the TMDS video transmission line 8 inside the reception device side connector 3 and detects a voltage of the TMDS video transmission line 8. The operation signal detection sensor 5 is, for example, a microcontroller. One end of the detection signal transmission dedicated line 6 is connected to the operation signal detection sensor 5.

Meanwhile, the transmission device side connector 1 includes a voltage converter 4. The voltage converter 4 is connected to the power supply line 9 of +5V inside the transmission device side connector 1 and generates +3.3V output from +5V power supplied from the power supply line 9. The voltage converter 4 has a function as an electronic circuit switch capable of on/off control based on a control signal input from an outside, another end of the detection signal transmission dedicated line 6 is connected to a control terminal of the voltage converter 4, and a control signal output from the operation signal detection sensor 5 is input to the control terminal. The +3.3V output of the voltage converter 4 is connected to the TMDS video transmission line 8 inside the transmission device side connector 1 via a resistor 12.

The operation signal detection sensor 5 detects instability of the voltage of the TMDS video transmission line 8 inside the reception device side connector 3 and outputs a control signal, so that the voltage converter 4 stops the +3.3V output when the control signal is input. When the HDMI reception device to which the reception device side connector 3 is connected is in the OFF state, the voltage of the TA/DS video transmission line 8 inside the reception device side connector 3 is unstable, and the operation signal detection sensor 5 detects instability of the voltage of the TMDS video transmission line 8 and outputs a control signal. The control signal output from the operation signal detection sensor 5 is input to the voltage converter 4 via the detection signal transmission dedicated line 6, so that the voltage converter 4 to which the control signal is input stops the +3.3V output. When the +3.3V output of the voltage converter 4 is stopped, the voltage of the TMDS video transmission line 8 inside the transmission device side connector 1 becomes also unstable.

Meanwhile, when the HDMI reception device to which the reception device side connector 3 is connected is in the ON state, the TMDS video transmission line 8 inside the reception device side connector 3 is pulled up to +3.3V, the supply of the control signal to the voltage converter 4 from the operation signal detection sensor 5 is stopped, and +3.3V is output from the voltage converter 4. Accordingly, the TMDS video transmission line 8 inside the transmission device side connector 1 is also pulled up to +3.3V.

Thus, the operation state (ON state or OFF state) of the connected HDMI reception device is transmitted to the HDMI transmission device by the operation signal detection sensor 5, the detection signal transmission dedicated. line 6. and the voltage converter 4. Accordingly, it is possible to perform detection of a connection of the HDMI reception device, which includes detection of the operation state of the HDMI reception device while having usability same as the conventional HDMI optical cable, and to prevent the occurrence of a defect phenomenon due to the combination of the HDMI transmission device and the HDMI reception device, thereby enabling stable signal transmission and stable video display.

Incidentally, a configuration can also be adopted in which the operation signal detection sensor 5 detects the pull up of the TMDS video transmission line 8 inside the reception device side connector 3 and outputs a control signal, and the voltage converter 4 outputs +3.3V when the control signal is input.

Although the present invention has been described using as an example the HDMI optical cable in which the transmission device side connector 1, the cable 2, and the reception device side connector 3 are integrated, the present invention can provide an HOW optical conversion device in which the transmission device side connector 1, the cable 2, and the reception device side connector 3 are configured separately from each other.

INDUSTRIAL APPLICABILITY

The present invention can be employed in industries related to broadcast equipments, commercial facilities, public facilities, home theaters or the like that display various videos, installation work and distribution services, which use many devices including an HDMI terminal such as a transmission device which is a DVD (registered trademark) player, a Blu-ray (registered trademark) player, a file player or the like, or a video transmission device which is a monitor, a projector or the like.

Although the embodiment of the present invention has been described above in detail, this is merely an example, and the present invention can be implemented in a mode with various modifications without departing from the spirit of the present invention.

This application is based on Japanese Patent Application No. 2016-218433 filed on Oct. 20, 2016. the contents of which are incorporated herein by reference.

DESCRIPTION OF REFERENCE NUMERALS 1 transmission device side connector
2 cable
3 reception device side connector
4 voltage converter and electronic circuit switch having connection detection function
5 operation signal detection sensor
6 detection signal transmission dedicated line
7 optical fiber wire
8 TMDS video transmission line
9 power supply line
10 optical transmitter
11 optical receiver
12 resistor

The invention claimed is:

1. An HDMI optical cable integrally comprising:
a transmission device side connector to be connected to an HDMI transmission device:
a reception device side connector to be connected to an HDMI reception device; and
a cable connecting the transmission device side connector and the reception device side connector, the cable including an optical fiber wire configured to transmit a video signal,
wherein the reception device side connector includes:
an optical receiver configured to convert an optical signal transmitted by the optical fiber wire into an electric signal;
a reception device side video transmission line configured to transmit the electric signal as a video signal output from the optical receiver to the HDMI reception device; and
a detection sensor configured to detect a voltage state of the reception device side video transmission line and output a detection signal,
wherein the cable further includes:
a dedicated electric wire configured to transmit the detection signal output from the detection sensor, and
wherein the transmission device side connector includes:
an optical transmitter configured to generate an optical signal to be transmitted by the optical fiber wire;
a transmission device side video transmission line configured to transmit an electric signal as a video signal output from the HDMI transmission device to the optical transmitter; and
a voltage converter configured to receive the detection signal transmitted by the electric wire and change a voltage state of the transmission device side video transmission line based on the received detection signal.

2. An HDMI optical conversion device separately comprising:
a transmission device side connector to be connected to an HDMI transmission device;
a reception device side connector to be connected to an HDMI reception device; and
a cable connecting the transmission device side connector and the reception device side connector, the cable including an optical fiber wire configured to transmit a video signal,
wherein the reception device side connector includes:
an optical receiver configured to convert an optical signal transmitted by the optical fiber wire into an electric signal;
a reception device side video transmission line configured to transmit the electric signal as a video signal output from the optical receiver to the reception device; and
a detection sensor configured to detect a voltage state of the reception device side video transmission line and output a detection signal,
wherein the cable further includes:
a dedicated electric wire configured to transmit the detection signal output from the detection sensor, and
wherein the transmission device side connector includes:
an optical transmitter configured to generate an optical signal to be transmitted by the optical fiber wire;
a transmission device side video transmission line configured to transmit an electric signal as a video signal output from the HDMI transmission device to the optical transmitter; and
a voltage converter configured to receive the detection signal transmitted by the electric wire and change a voltage state of the transmission device side video transmission line based on the received detection signal.

* * * * *